June 25, 1940.  H. T. KRAFT  2,205,661
RADIATOR COVER
Filed April 9, 1937
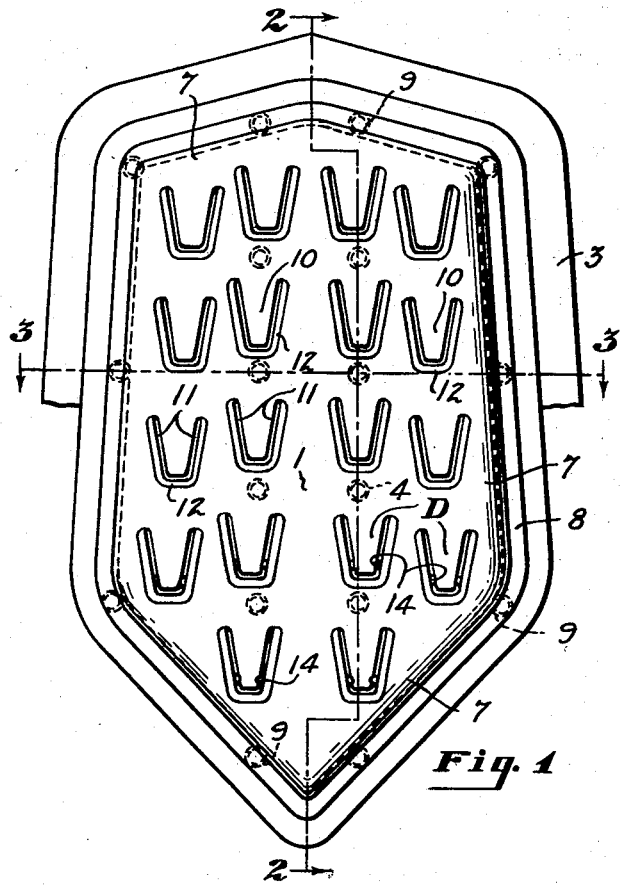
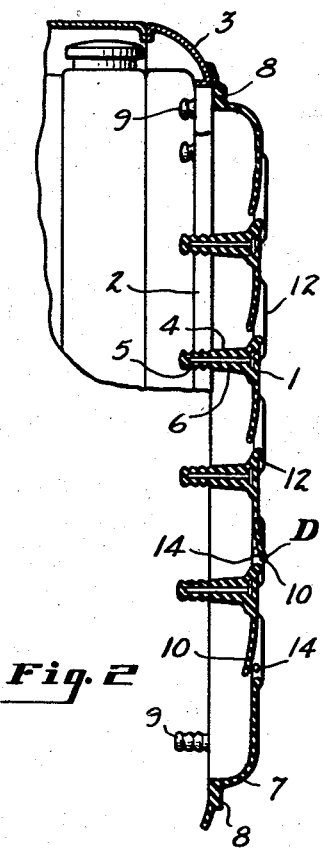
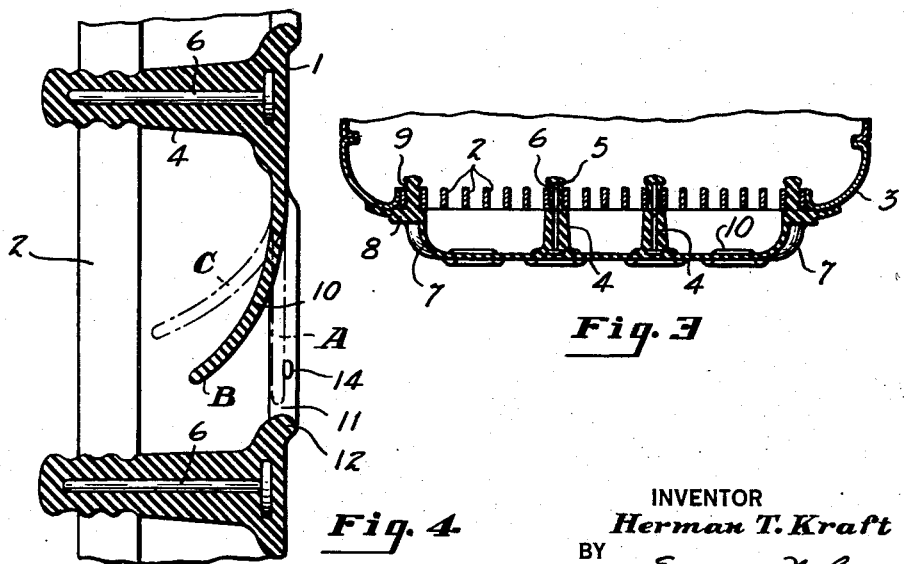
INVENTOR
*Herman T. Kraft*
BY *Evans & McCoy*
ATTORNEYS Patented June 25, 1940

2,205,661

UNITED STATES PATENT OFFICE 2,205,661

RADIATOR COVER

Herman T. Kraft, Akron, Ohio, assignor to The General Tire & Rubber Company, Akron, Ohio, a corporation of Ohio Application April 9, 1937, Serial No. 135,901

12 Claims. (Cl. 257—132)

This invention relates to shields for radiators and more particularly to devices of this character for regulating the flow of air through the cooling liquid radiator of an internal combustion engine.

It is customary in cold climates to install on automobile radiators, covers or shields which restrict the amount of air admitted to the radiator so that the cooling effect on the circulating cooling liquid may be controlled. The usual method is to apply a metal or fabric member over a portion of the radiator or grill and secure it in place by some suitable fastening means. The relative change in the quantity of air permitted to flow through the radiator is thus substantially proportional to the area of the radiator thus obstructed by the cover. Some shields or covers provide means by which the relative proportion of radiator area covered may be regulated, such as by an extensible screen or by flaps in the cover which may be opened or closed by manual manipulation or thermostatic control. However, such covers have not been entirely satisfactory since it is inconvenient to get out of an automobile to open up the flaps after an engine has warmed up and again to close the flaps when the engine is stopped, and the thermostatic devices, in addition to being relatively expensive are not wholly reliable in operation. As a general rule the amount of heat generated by an internal combustion engine is substantially proportional to the speed and the load. Accordingly, it is desirable that the amount of air admitted to cool the radiator and engine bear some relation to the speed.

It is, therefore, an object of the present invention to provide a radiator shield which is arranged to admit air to the radiator and engine in accordance with the speed thereof.

Another object is to provide such a device which automatically restricts the amount of air admitted to the engine when speed decreases.

A more specific object is to provide a radiator shield which has flaps actuated by air pressure and which are arranged to control the quantity of air admitted to an internal combustion engine and radiator proportionately to the air pressure on the flaps.

A still further object is to provide a radiator shield which is simple in design and inexpensive to manufacture and which may be readily formed of a plastic material such as rubber by a molding process.

Other objects and advantages will become apparent from the following detailed description of a shield constructed in accordance with the present invention. This description is made in connection with the accompanying drawing, in which Figure 1 is an elevational view, with parts removed, of a shield attached to the radiator grill of an automotive vehicle;

Fig. 2 is a side elevational view in section and with parts broken away, taken substantially on the line 2—2 of Fig. 1;

Fig. 3 is a sectional view taken substantially on the line 3—3 of Fig. 1; and

Fig. 4 is an enlarged fragmentary view in section showing one of the air-flow regulating flaps and the supporting plugs of the shield.

The shield comprises a cover I which may be formed of any suitable material such as sheet rubber. This cover is arranged to extend substantially over the entire exposed part of a radiator or radiator grill. As illustrated in the drawing, the radiator grill consists of a plurality of spaced vertically extending bars 2 which extend across the radiator opening in the radiator shell 3.

The cover I is supported in spaced relation with respect to the grill bars 2 for a purpose to be hereinafter explained by means of a plurality of plugs 4. The plugs are provided with a resilient, yielding and deformable holding portion 5 which is preferably formed with a number of annular ridges. The diameter of the holding portion 5 of the plugs is such that it is slightly deformed when forced between adjacent grill bars 2 so that the bars frictionally engage the holding portion to retain the plugs 4 in outstanding position and thus carry the cover I as mentioned above.

In forming the plugs 4, which are preferably made of rubber, it is desirable to incorporate therein a suitable reinforcing element 6 which may be in the form of a metallic rod having a flattened head portion against which pressure may be applied when forcing the holding portion 5 of the plug between the grill bars of a radiator. The marginal portions of the cover I are formed into a curved or rounded apron or skirt 7 which extends to the plane of the grill bars and is effective to prevent air flowing between the marginal portions of the apron and the radiator grill. As mentioned above, the apron is held in spaced relation with respect to the grill bars and the apron or skirt is provided to effect a substantially complete closing of the radiator opening in the radiator shell 3. The edge of the skirt 7 positioned adjacent the grill bars is formed into a bead 8 which is relatively rigid and tends to retain the normal shape of the shield. Desirably the bead 8 may also be provided with holders 9 which correspond to the holding portions 5 of the plugs 4.

At spaced intervals over the surface of the cover 1, apertures are provided to admit air to the cooling liquid radiator and engine. Each aperture is provided with a closure or flap 10. The closure and flap may be formed by a substantially U-shaped slot or cut 11 in the cover 1. Preferably this slot is formed so that the flap 10 is secured by an upper edge to a marginal portion of the aperture. The flaps may be formed integrally with the cover member and if desired the entire shield may be formed in a single molding operation. Flaps formed integrally with the cover are normally positioned in the apertures to close the same and obstruct the passage of air therethrough. Accordingly, the shield prevents excessive cooling of the engine and radiator in a cold climate. In order to assist the cover in retaining its shape a reinforcing bead 12 is formed marginally adjacent each of the slots 11 and partially compensates for the weakening of the cover occasioned by the slots.

The flaps 10 are arranged so that when the shield is applied to the radiator of an automotive vehicle they will hang downwardly in the apertures, suspended by an upper edge thereof, this position being indicated by A of Fig. 4, which may be the position of the flaps when the vehicle engine is at rest. When the motor vehicle is under way or the engine is started so that the cooling fan tends to draw air in through the radiator openings and between the bars of the radiator grill, a difference in air pressure on the two sides of the shield is developed, this pressure being greater on the outside of the shield, tending to force the flaps inwardly toward the radiator to the position indicated at B of Fig. 4. This bending inwardly of the flaps is resisted by their natural resiliency and inherent tendency to remain in the aperture closing position A. At very high speeds of the motor vehicle, when the air pressure on the outside of the shield tending to force air through the shield and radiator is considerably greater than the air pressure on the inner side of the shield, the flaps may be deflected and bent inwardly to the position indicated at C of Fig. 4. At very low speeds of the engine, such as when it is idling, the flaps 10 will be barely displaced from their normal closing position so that very slight amounts of air will be admitted. Such a position of the flaps is indicated in Fig. 2.

Accordingly, the present radiator shield is arranged to admit air to cool the radiator and the engine of the motor vehicle substantially in accordance with the speed of the vehicle, it being understood that at higher speeds the motor fan will create a greater suction because of its being rotated at higher velocity than at lower speeds. This feature of the present invention is particularly advantageous since the amount of heat developed by an internal combustion engine and which must be dissipated by its cooling system, bears a proportional relationship with the speed of the engine. At high speeds which tend to draw the flaps 10 inwardly to open the closures, larger quantities of air will be admitted to cool the radiator and engine, whereas at low speeds the flaps 10 will not be drawn inwardly so far, and, accordingly, less air will be admitted and the cooling effect will not be so great. In this manner the shield automatically adjusts the cooling of the engine so that a minimum of attention of the operator is required and the engine operates with increased efficiency and economy.

As an engine of an automotive vehicle equipped with a radiator shield of this character slows from a higher speed to a lower speed, the flaps automatically and simultaneously adjust themselves to provide an opening through the apertures proportional to the speed of the engine so that regardless of whether the engine is continuously operated at a uniform speed or whether it is subjected to alternate acceleration and deceleration the proper amount of cooling air will be admitted to the radiator and engine.

In climates where the temperature is subject to considerable variation from time to time it may be desirable that the proportion of air admitted to cool the radiator and engine at various speeds may be predetermined. Accordingly, it is proposed to provide means for securing some of the flaps 10 in their respective apertures so that they are not displaced therefrom by the difference in air pressure described above. Such a holding means may conveniently be provided by one or more tabs or fingers 14 which are formed at marginal portions of the apertures and extend inwardly across the slots 11 and into the arcuate path of the flaps 10. Normally the tabs 14 are positioned on the outside of the flaps as indicated in Fig. 4, and do not interfere with the normal movement of the flaps. In the event, however, that at very low temperatures the quantity of cooling air admitted is more than necessary to enable the engine to operate at its maximum efficiency, then one or more flaps may be physically pulled out and placed on the outside of the fingers 14 as indicated at D in Figs. 1 and 2. Inward movement of the flaps thus held on the outside of the fingers 14 is prevented and the flaps do not move to open the apertures upon a difference in air pressure. Accordingly, the relative proportion of cooling air admitted to the radiator and engine at the various speeds is diminished and compensation is made for temperature differentials.

The present invention thus affords a shield for an automotive vehicle or the like which automatically adjusts the cooling air admitted to the engine substantially proportionally with the engine speed and in synchronization therewith. These shields are compact, unitary structures and, as previously mentioned, may be formed integrally of a suitable plastic composition such as rubber by a molding operation.

Although a single embodiment of the invention has been herein shown and described, it will be understood that numerous modifications of the construction and arrangement of the several parts may be resorted to without departing from the spirit of the invention as defined in the appended claims.

What I claim is:

1. A radiator shield, comprising a cover having one or more apertures, flaps for closing the apertures and arranged to be moved by air pressure to open the apertures and permit air to flow through the radiator, means carried by the cover and engageable with selected flaps to retain such flaps in aperture closing position regardless of the air pressure, and means for securing the shield in position to obstruct the flow of air through the cooling liquid radiator of an internal combustion engine.

2. A radiator shield, comprising a cover having one or more apertures, flaps for closing the apertures and arranged to be moved by air pressure to open the apertures and permit air to flow through the radiator, means engageable with selected flaps to retain such flaps in aperture closing position regardless of the air pressure, comprising one or more tabs extending into the path of a flap and arranged to support the flap against air pressure, and means for securing the shield in position to obstruct the flow of air through the cooling liquid radiator of an internal combustion engine.

3. A rubber radiator shield comprising a cover portion for overlying the major portion of the radiator area and obstructing the flow of air through the radiator, means for securing the cover in spaced substantially parallel relation with respect to the radiator grill, a multiplicity of substantially U-shaped slots formed in the cover to provide openings normally substantially closed by rubber flaps integral with the rubber of the cover, portions of the cover marginally adjacent the slots being thickened to provide U-shaped ribs alongside the slots to reinforce the shield, the flaps being deformable by air pressure for displacement from aperture-closing position to permit the flow of air through the cover and radiator and arranged to automatically return to aperture-closing position upon being relieved of the said air pressure.

4. An air regulator for a radiator grill or the like which comprises a relatively thin flexible cover formed of resilient rubber composition and adapted to overlie a radiator grill and obstruct the flow of air therethrough, a plurality of slits formed in the cover to define therein a multiplicity of air admitting apertures and a multiplicity of air flow regulating flaps of resilient rubber composition, each of said flaps being integrally secured along one edge thereof to the cover, said flaps being normally retained in the apertures by the inherent elasticity of the same to substantially close the apertures and restrict the flow of air through the apertures, and means for securing the cover in overlying relation with respect to the grill.

5. An air flow regulator for a radiator grill or the like which comprises a relatively thin flexible cover adapted to overlie a radiator grill and obstruct the flow of air therethrough, a multiplicity of spaced air admitting apertures formed in the cover and separated from one another by areas of the cover, the apertures being individually of relatively small area and of less aggregate area than the intervening portions of the cover a multiplicity of resilient air flow regulating flaps formed of relatively thin elastic rubber composition secured to the cover and normally disposed across said apertures to substantially close the same and restrict the flow of air therethrough, said flaps arranged to be displaced from aperture closing position by a relative increase in air pressure on one side of the cover with respect to the air pressure on the other side thereof to thereby permit the flow of air through the apertures, and said flaps further adapted to return by inherent elasticity to normal position upon substantial equalization of the pressures on both sides of the cover, and means for securing the cover in overlying relation with respect to the grill.

6. An air flow regulator for a radiator grill or the like which comprises a relatively thin flexible cover adapted to overlie a radiator grill and obstruct the flow of air therethrough, a multiplicity of spaced air admitting apertures formed in the cover and separated from one another by areas of the cover, a multiplicity of resilient air flow regulating flaps formed of relatively thin elastic rubber composition secured to the cover and normally disposed across said apertures to substantially close the same and restrict the flow of air therethrough, said flaps arranged to be displaced from aperture closing position by a relative increase in air pressure on one side of the cover with respect to the air pressure on the other side thereof to thereby permit the flow of air through the apertures, and said flaps further adapted to return by inherent elasticity to normal position upon substantial equalization of the pressures on both sides of the cover, spacing members secured to one side of the cover in the region of said areas and extending laterally therefrom, and holding elements on the ends of the spacing members for securing the regulator to the radiator grill, the spacing members arranged to support the cover in spaced relation with respect to the grill to provide a space between the cover and grill for receiving the displaced flaps.

7. An air flow regulator for a radiator grill or the like which comprises a relatively thin flexible cover adapted to overlie a radiator grill and obstruct the flow of air therethrough, a multiplicity of spaced air admitting apertures formed in the cover and separated from one another by areas of the cover, a multiplicity of resilient air flow regulating flaps formed of relatively thin elastic rubber composition secured to the cover and normally disposed across said apertures to substantially close the same and restrict the flow of air therethrough, said flaps arranged to be displaced from aperture closing position by a relative increase in air pressure on one side of the cover with respect to the air pressure on the other side thereof to thereby permit the flow of air through the apertures, and said flaps further adapted to return by inherent elasticity to normal position upon substantial equalization of the pressures on both sides of the cover, spacing members secured to one side of the cover in the region of said areas and extending laterally therefrom, and holding elements on the ends of the spacing members for securing the regulator to the radiator grill, the spacing members arranged to support the cover in spaced relation with respect to the grill to provide a space between the cover and grill for receiving the displaced flaps, and stiffening members substantially coextensive in length with the spacing members between the cover and the grill and having enlarged heads disposed substantially in the plane of the cover and secured thereto, said stiffening members being associated with the spacing members to stiffen the latter and resist lateral shifting of the cover with respect to the grill.

8. An air flow regulator for a radiator grill or the like which comprises a relatively thin flexible cover adapted to overlie a radiator grill and obstruct the flow of air therethrough, a multiplicity of spaced air admitting apertures formed in the cover and separated from one another by areas of the cover, a multiplicity of resilient air flow regulating flaps formed of relatively thin elastic rubber composition secured to the cover and normally disposed across said apertures to substantially close the same and restrict the flow of air therethrough, said flaps arranged to be displaced from aperture closing position by a relative increase in air pressure on one side of the cover with respect to the air pressure on the other side thereof to thereby permit the flow of air through the apertures, and said flaps further adapted to return by inherent elasticity to normal position upon substantial equalization of the pressures on both sides of the cover, means for supporting the cover in spaced, substantially parallel relation to the radiator grill, a relatively thin flexible apron formed of the material of the cover and integral therewith extending from a marginal portion of the cover to substantially the plane of the grill and arranged to prevent the flow of air around said margin of the cover into the space between the cover and the grill, and means for attaching the regulator to the grill.

9. An air regulator for a radiator grill or the like which comprises a relatively thin flexible cover formed of resilient rubber composition and adapted to overlie a radiator grill and obstruct the flow of air therethrough, a plurality of spaced air admitting apertures formed in the cover and separated from one another by areas of the cover, a plurality of air flow regulating flaps formed of relatively thin elastic rubber composition secured to the cover and normally disposed across said apertures to substantially close the same and restrict the flow of air therethrough, said flaps arranged to be displaced from aperture closing position by a relative increase in air pressure on one side of the cover with respect to the air pressure on the other side of the cover to thereby permit the flow of air through the apertures, and said flaps further adapted to return by inherent elasticity to normal aperture closing position upon substantial equalization of the pressures on both sides of the cover, and deformable rubber plugs formed integrally with the cover and extending laterally from the region of said areas, said plugs adapted to be forced between adjacent elements of the grill by pressure applied to said areas of the cover on the opposite side thereof from that on which the plugs are formed.

10. An air regulator for a radiator grill or the like which comprises a relatively thin flexible cover formed of resilient rubber composition and adapted to overlie a radiator grill and obstruct the flow of air therethrough, a plurality of slits formed in the cover to define therein a multiplicity of air admitting apertures and a multiplicity of air flow regulating flaps of resilient rubber composition, each of said flaps being integrally secured along one edge thereof to the cover, said flaps being normally retained in the apertures by the inherent elasticity of the same to substantially close the apertures and restrict the flow of air through the apertures, a plurality of rubber tabs formed integrally with the cover and extending partially into said air admitting apertures, said tabs being engageable with the flaps to support the flaps against air pressure and substantially retain the flaps in the apertures, and means for securing the cover in overlying relation with respect to the grill.

11. An air flow regulator for a radiator grill or the like which comprises a relatively thin flexible cover adapted to overlie a radiator grill and obstruct the flow of air therethrough, a multiplicity of spaced air admitting apertures formed in the cover and separated from one another by areas of the cover, a multiplicity of resilient air flow regulating flaps formed of relatively thin elastic rubber composition secured to the cover and normally disposed across said apertures to substantially close the same and restrict the flow of air therethrough, said flaps arranged to be displaced from aperture closing position by a relative increase in air pressure on one side of the cover with respect to the air pressure on the other side thereof to thereby permit the flow of air through the apertures, and said flaps further adapted to return by inherent elasticity to normal position upon substantial equalization of the pressures on both sides of the cover, a relatively rigid bead formed along a marginal edge of the cover to substantially retain the relatively limp and collapsible cover in extended position and arranged to lie against a grill structure, a laterally extending flexible flange secured to the bead and arranged to be disposed against the grill structure marginally of the area of the grill normally overlain by the cover, and means for securing the cover in overlying relation with respect to the grill.

12. An integral rubber shield for a radiator grill comprising a cover portion for overlying the grill in spaced relation with respect thereto and obstructing the flow of air therethrough, a rubber apron portion formed at a margin of the cover and extending angularly therefrom substantially to the grill for preventing the flow of air between said grill and apron around said margin of the apron, said apron having a free edge disposable against the grill and means for securing said free edge snugly against the grill, means for supporting the cover portion in substantially uniformly spaced relation with respect to the grill, said last named means comprising a plurality of posts, of greater individual length than the edge-securing means, secured to central areas of the cover portion and extending to the grill, and a plurality of slits formed in the cover portion of the shield to define therein a multiplicity of air admitting apertures and resilient rubber flaps integral with the rubber of the cover portion, said flaps normally substantially closing the apertures and adapted for displacement from their normal aperture closing position by the pressure of air directed thereagainst to permit the flow of air through the apertures and said flaps further adapted to return by inherent elasticity to normal aperture closing position upon cessation of said air pressure.

HERMAN T. KRAFT.